Nov. 1, 1927.
L. RUSCONI
DRAFT EQUALIZER
Filed July 8, 1926
1,647,888
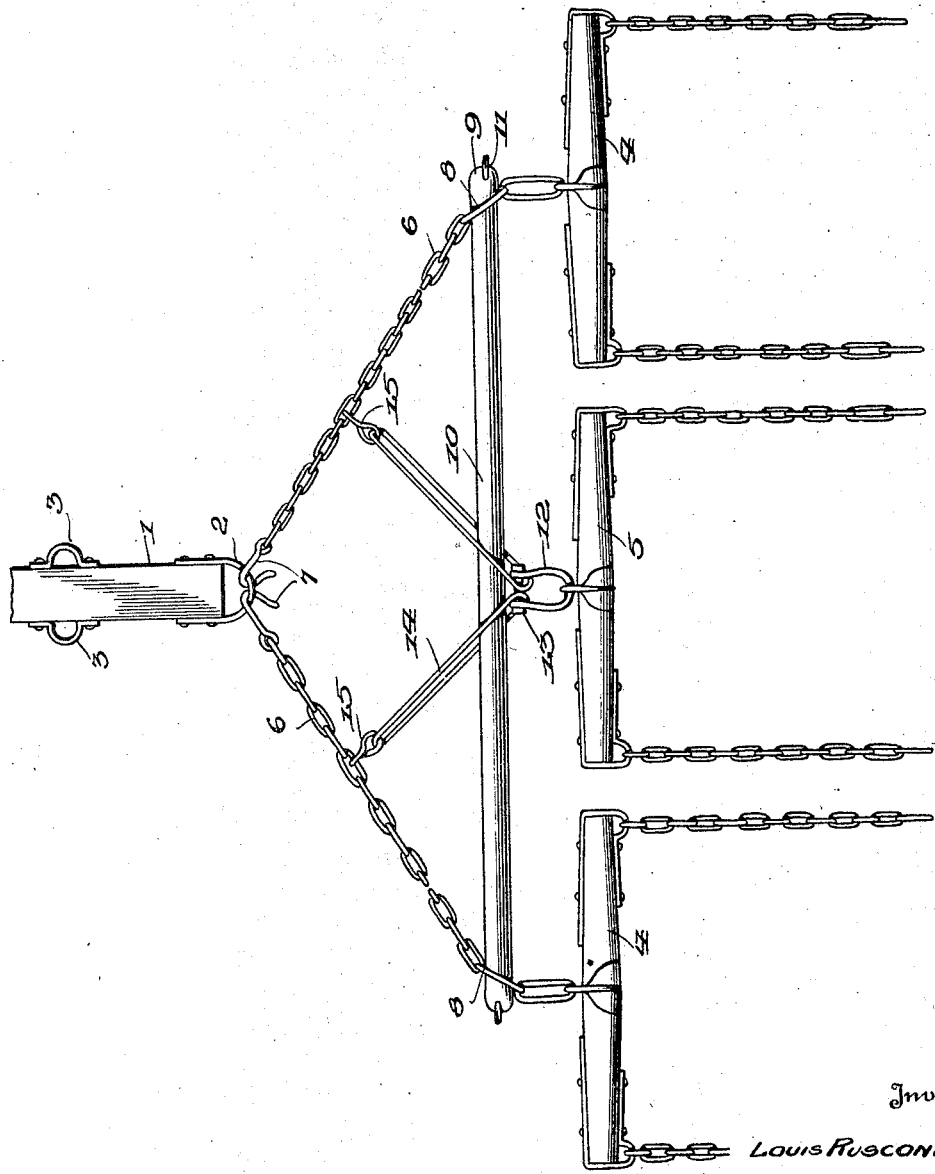
Inventor
Louis Rusconi,
By Bernard F. Garvey
Attorney Patented Nov. 1, 1927.

1,647,888

UNITED STATES PATENT OFFICE.

LOUIS RUSCONI, OF FRESNO, CALIFORNIA.

DRAFT EQUALIZER.

Application filed July 8, 1926. Serial No. 121,140.

The present invention consists of a draft equalizer and has for an object the provision of suitable means for connecting a span of three horses to a wagon tongue in such a manner that the line of draft will be coincident to the longitudinal axis of the tongue, thereby preventing unevenness of the pull and see-sawing of the draft animals.

A further object of the invention is to provide draft equalizing means which is especially adapted for a three-horse span but which may be expeditiously converted for use with two horses without impairing the effectiveness of the equalizer or changing its mode of operation.

Other objects of the invention will be apparent from the following description of the present preferred form of the invention taken in connection with the accompanying drawing, wherein:—

The figure of the drawing is a top plan view of an equalizer constructed in accordance with this invention illustrating its application.

In order to illustrate the application of the present invention a portion of a wagon tongue 1 is shown which may be of standard configuration and is equipped with a terminal loop 2 of usual construction. In addition the tongue is provided on the opposite sides thereof, at a point remote from the loop 2, with a pair of looped straps 3.

The present invention contemplates the use of a pair of outside single trees 4 and an inside single tree 5 to each of which a horse or other draft animal may be connected in a manner well known in the art. Each of the outside single trees has one end of a draft chain 6 engaged thereto, the opposite end of each chain having a hook 7 mounted thereon which is adapted for detachable engagement to either the loop 2 or the straps 3. Each of the chains has an intermediate enlarged link 8 in the end thereof which engages the single tree. These enlarged links are adapted to slidably receive the flattened outer ends 9 of a draw-bar 10. The draw-bar may be made of metal or other suitable material but in the present instance is shown to be of circular configuration. The flattened outer ends thereof are adapted to receive stays 11 to prevent accidental displacement of the links 8 from the draw-bar.

The inside single tree 5 carries a clevis 12 which includes a removable bolt 13 at the mouth thereof. The clevis is adapted to receive one end of each of a pair of elongated links 14, each of said links straddling the bar 10 and having the opposite end thereof engaged with a quarter turn link 15 which is secured to the draft chain 6. Upon reference to the drawing it will be noted that the links 15 are connected to the chains at a point closer to the links 7 than to the links 8. As shown in the drawing the links 14 are so connected to the draft chains and to the clevis that the driver can immediately perceive whether or not the draft animal connected to the inside single tree is pulling. Where a long hitch is desired the hooks 7 are connected to the loop 2 of the tongue as shown in the drawing. However, where a short hitch is desired, the hooks 7 are engaged to the straps 3.

Should it be desired to use one span of two horses with the equalizer it is only necessary to remove the clevis bolt 13 permitting the inside single tree to be detached in an apparent manner. This in no wise affects functioning of the equalizer. When the three-horse span is used it is apparent that the middle or inside animal is directly in the path of the wagon tongue and the line of stress is at the center of the wagon tongue so that lateral switching of the tongue is diminished and equalization of the pull is assured.

Although I have described the preferred method of using this equalizer it is of course to be understood that it may be used in other ways and that changes may be made therein within the scope of the claims hereto appended.

What I claim is:

1. A draft equalizer, including equalizing means for engaging a three-horse span with a wagon tongue embodying draft chains extending from the two outside single trees to the wagon tongue, means engaged with said chains to hold the outside single trees spaced from the inside single tree and links engaged with said chains and the inside single tree.

2. A draft equalizer including a series of single trees the outermost of which are equipped with flexible wagon tongue engaging elements, a draw-bar arranged between said elements and engaged therewith and a pair of links straddling the draw-bar, one end of each of which is engaged with an intermediate single tree and the opposite end engaged with one of the wagon tongue engaging elements.

3. A draft equalizer for a three-horse span including a pair of outside single trees and an inside single tree, a draft chain adapted to be fastened to a wagon tongue extending from each of the outside single trees, a draw-bar engaged with said chain, and links straddling the said draw-bar, one end of each of which is engaged with the inside single tree and the opposite end of each engaged with one of the draft chains.

4. A draft equalizer for a three-horse span including a pair of outside single trees and an inside single tree, draft chains one end of each of which is engaged with each outside single tree and the opposite end equipped with a tongue engaging hook, a draw bar the opposite ends of which are flattened and engaged through links in said chains, and elongated links straddling said bar and engaged with the inside single tree and with the draft chains.

In testimony whereof I affix my signature.

LOUIS RUSCONI.